US006892077B2

(12) United States Patent
Lin

(10) Patent No.: US 6,892,077 B2
(45) Date of Patent: May 10, 2005

(54) EXTERNAL DATA-INPUT DEVICE AND SPEECH INPUTTING METHOD OF PORTABLE ELECTRONICAL DEVICE

(75) Inventor: Winky Lin, Taoyuan (TW)

(73) Assignee: Lite-On Technology Corporation, Taipei (TW)

( * ) Notice: Subject to any disclaimer, the term of this patent is extended or adjusted under 35 U.S.C. 154(b) by 769 days.

(21) Appl. No.: 09/821,007

(22) Filed: Mar. 29, 2001

(65) Prior Publication Data

US 2003/0008678 A1 Jan. 9, 2003

(51) Int. Cl.[7] .................................................. H04M 1/00
(52) U.S. Cl. .................... 455/556.1; 455/95; 455/556.2
(58) Field of Search ........................... 455/556.1, 556.2, 455/557, 558, 561, 95, 575.1, 414.1, 575.3, 575.6, 550.1, 575.9, 90.3; 704/239

(56) References Cited

U.S. PATENT DOCUMENTS

| | | | | |
|---|---|---|---|---|
| 6,108,716 A | * | 8/2000 | Kimura et al. ................. 710/1 |
| 6,118,986 A | * | 9/2000 | Harris et al. .............. 455/575.3 |
| 6,201,951 B1 | * | 3/2001 | Duwaer et al. ............. 455/74.1 |
| 6,538,880 B1 | * | 3/2003 | Kamijo et al. .............. 361/686 |
| 6,665,173 B2 | * | 12/2003 | Brandenberg et al. ...... 361/680 |
| 6,690,947 B1 | * | 2/2004 | Tom ........................ 455/556.1 |

* cited by examiner

Primary Examiner—Edward F. Urban
Assistant Examiner—Thuan Nguyen
(74) Attorney, Agent, or Firm—Klein, O'Neill & Singh, LLP; Howard J. Klein

(57) ABSTRACT

An external data-input device for a portable electronic device is provided. The external data-input device includes a speech receiving and recognizing device detachably connected with the electronic device for sending a controlling signal to the portable electronic device when the speech receiving and recognizing device receives a first sound speech signal, and an input device detachably connected to the speech receiving and recognizing device and the portable electronic device for storing the controlling signal in the speech receiving and recognizing device when the input device is connected to the speech receiving and recognizing device.

18 Claims, 17 Drawing Sheets

EXTERNAL DATA-INPUT DEVICE AND SPEECH INPUTTING METHOD OF PORTABLE ELECTRONICAL DEVICE

FIELD OF THE INVENTION

The present invention relates to an external data-input device and a speech inputting method for a portable electronic device to control an input speech.

BACKGROUND OF THE INVENTION

Owing to the rapidly improvement of manufacturing technique many portable electronic devices are changed to be smaller, lighter, thinner and more elaborate than before so as to increase the convenience for people to use. For example, a mobile phone or a PDA (personal digital assistant) is developed to perform wireless communication and transmit data more efficiently when people need to store a personal information immediately. Thus, the portable electronic devices have become the necessaries in modern life.

When the portable electronic devices have become smaller, the size of the interface of the portable electronic devices are required to be, which will often causes great inconvenience for inputting data. For example, a touchable screen in a conventional PDA device is the customarily used input device for people to input data into the PDA. In addition, cause the keypads on the mobile phone is smaller than before, the users could frequently press the keypad by mistake. Thus, the input interface constructed in the mobile phone need to be reduced either, which also causes inconvenience.

Therefore, it is an attempt by the applicant to provide an external input device to solve the problems as described above and an easy-operated external data-input device for people to input the data into the portable electronic device.

SUMMARY OF THE INVENTION

It is therefore an object of the present invention to provide an external data-input device for people input data into an electronic device more conveniently.

According to the present invention, the external data-input device includes a speech receiving and recognizing device detachably connected with the portable electronic device for sending a controlling signal to the portable electronic device when the speech receiving and recognizing device receives a first sound speech signal, and an input device detachably connected to the speech receiving and recognizing device and the portable electronic device for storing the controlling signal in the speech receiving and recognizing device when the input device is connected to the speech receiving and recognizing device.

Preferably, the speech receiving and recognizing device further includes a microphone, a filter, an analog-to-digital converter, a storing device and a comparing device.

Preferably, the microphone is used for receiving the first speech signal and converting the first speech signal into an analog signal.

Preferably, the filter electrically connected to the microphone for filtering noises different from human sound frequency.

Preferably, the analog-to-digital converter is used to be electrically connected with the filter for converting the analog signal passing through the filter into a first digital signal.

Preferably, the storing device is used to be electrically connected with the analog-to-digital converter for storing the first digital signal and the controlling signal and building a corresponding relation between the first digital signal and the controlling signal.

Preferably, the comparing device is used to be electrically connected to the analog-to digital converter and the storing device for comparing the first digital signal stored in the storing device with a second digital signal which is converted from a second speech signal via the microphone, the filter and the analog-to-digital converter, and sending the controlling signal to the portable electronic device according to the corresponding relation between the first digital signal and the controlling signal when the degree of the similarity between the first digital signal and the second digital signal is larger than a threshold value.

Preferably, the comparing device is a digital signal processor (DSP).

Preferably, the input device is a keyboard having a hot key for sending the controlling signal when the hot key is pressed.

Preferably, the external data-input device further comprises a connecting cable detachably connected between the speech receiving and recognizing receiving device and the input device.

Preferably, the external data-input device further comprises a connecting cable detachably connected between the speech receiving and recognizing receiving device and the electronic device.

Preferably, the electronic device is a personal digital assistant (PDA).

Preferably, the electronic device is a mobile phone.

It is therefore another object to provide a speech inputting and controlling method to teach the portable electronic device for learning and responding a sound speech spoken by a user.

According to the present invention, the speech inputting and controlling method is applied to a portable electronic device and the external data-input device. The external data-input device has a speech receiving and recognizing device detachably connected to the portable electronic device and an input device detachably connected to the speech receiving and recognizing device and the portable electronic device. The method includes steps of causing the speech receiving and recognizing device to enter into a learning mode in a speech controlling state, receiving a first speech signal from a user and a controlling signal from the input device in the learning mode, and building a corresponding relation between the first speech signal and the controlling signal, causing the speech receiving and recognizing device to enter into a waiting mode, and comparing the first digital signal stored in the storing device with a second digital signal which is converted from a second speech signal via the microphone, the filter and the analog-to-digital converter, and sending the controlling signal to the portable electronic device according to the corresponding relation between the first digital signal and the controlling signal when the degree of the similarity between the first digital signal and the second digital signal is larger than a threshold value.

It is a further object of the present invention to provide an external data-input device to be detachably connected to the portable electronic device.

According to the present invention, the external data-input device includes a speech receiving and recognizing device detachably connected with the portable electronic device for converting a speech signal into a digital signal and sending a controlling signal to the portable electronic device, and an input device detachably connected to the speech receiving and recognizing device and the portable electronic product for storing the controlling signal in the speech receiving and recognizing receiving device when the input device is connected to said speech receiving and recognizing receiving device.

A better understanding of the present invention can be obtained when the following detailed description of a preferred embodiment is considered in conjunction with the following drawings, in which:

DETAILED DESCRIPTION OF THE EMBODIMENTS

Figure 1A:
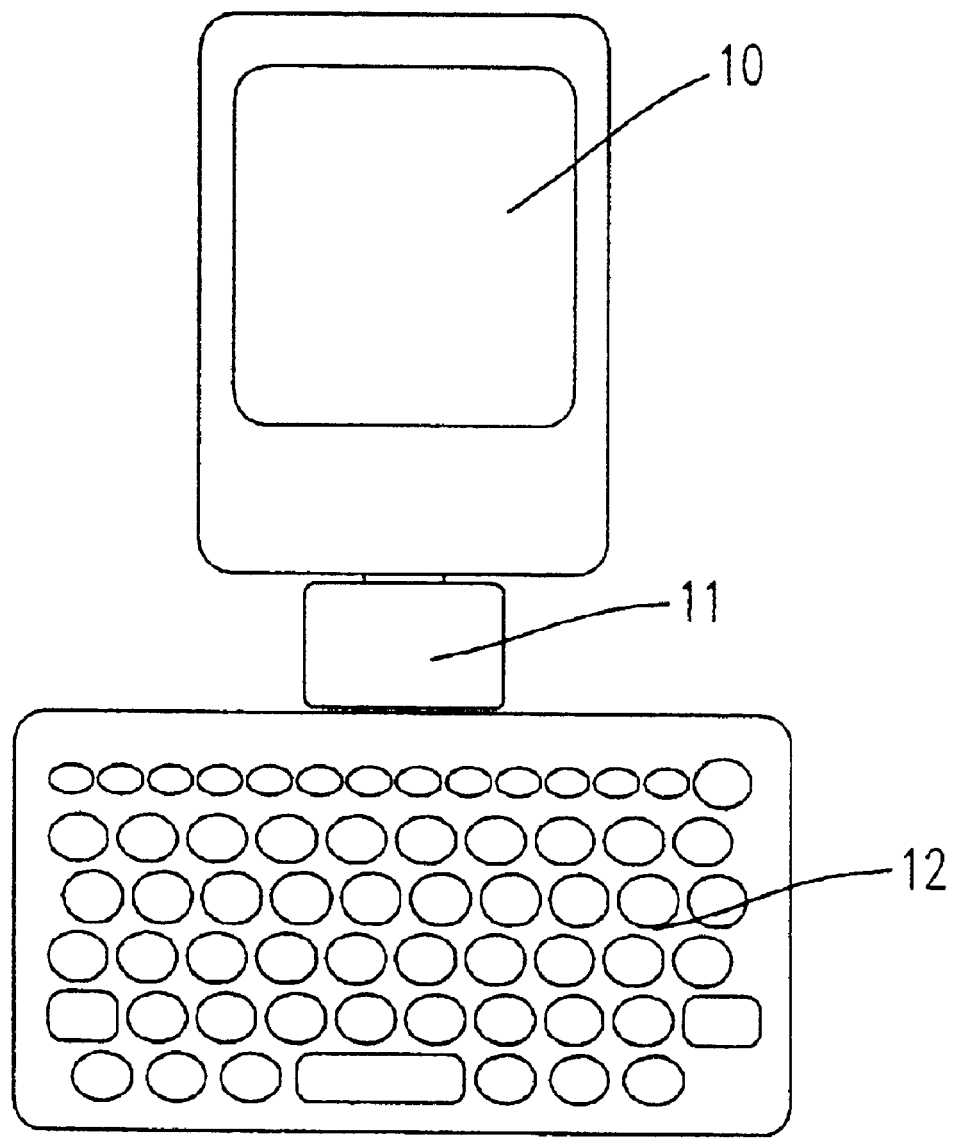
FIGS. 1(a) and 1(b) shows a PDA is detachably connected to an external data-input device including a receiving and recognizing device and a keyboard according to the first embodiment of the present invention.
Figure 1B:
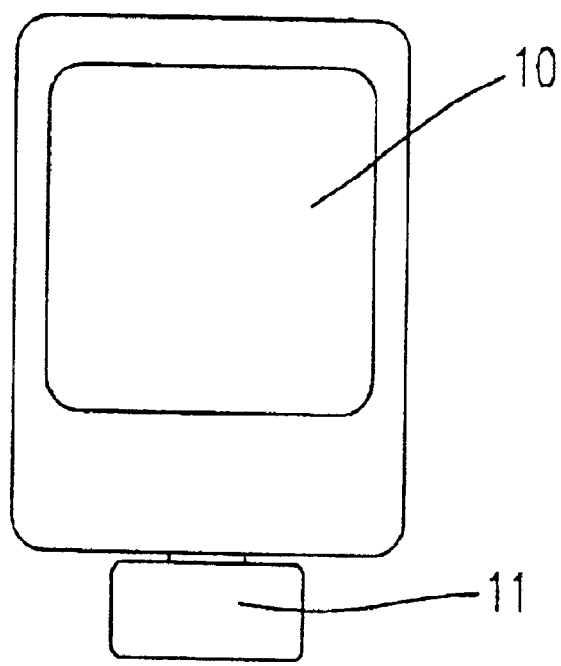
Figure 1B:
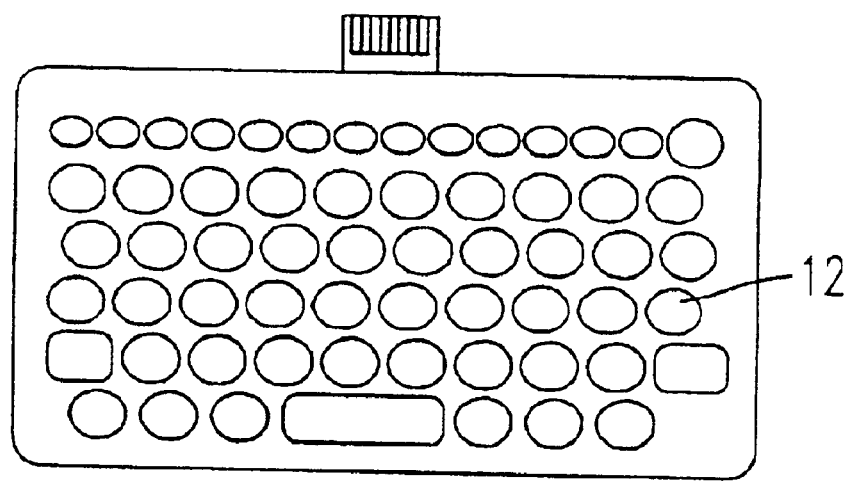
Figure 2A:
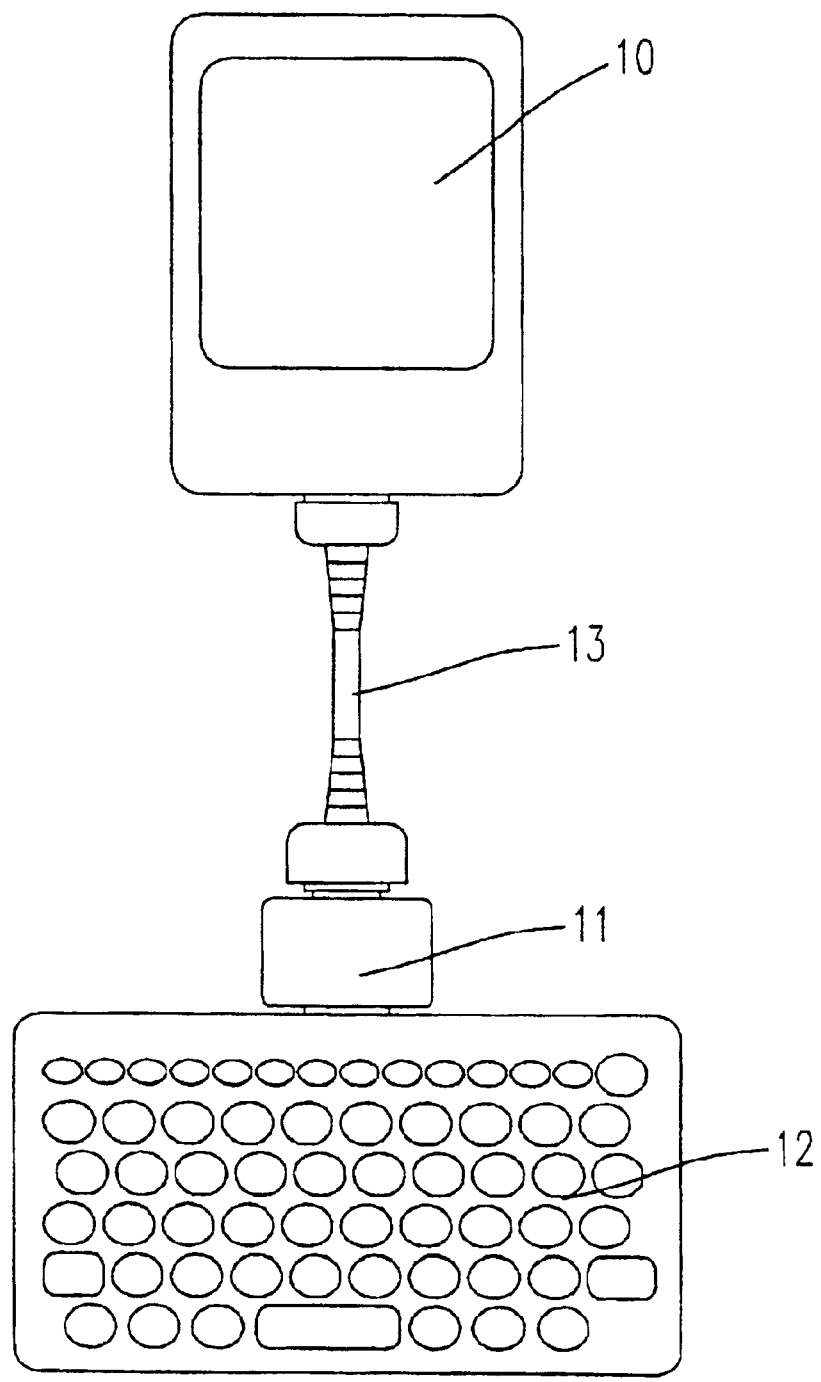
FIGS. 2(a) and 2(b) show a connecting cable is detachably connected between the PDA and the receiving and recognizing device according to the second embodiment of the presenting invention.
Figure 2B:
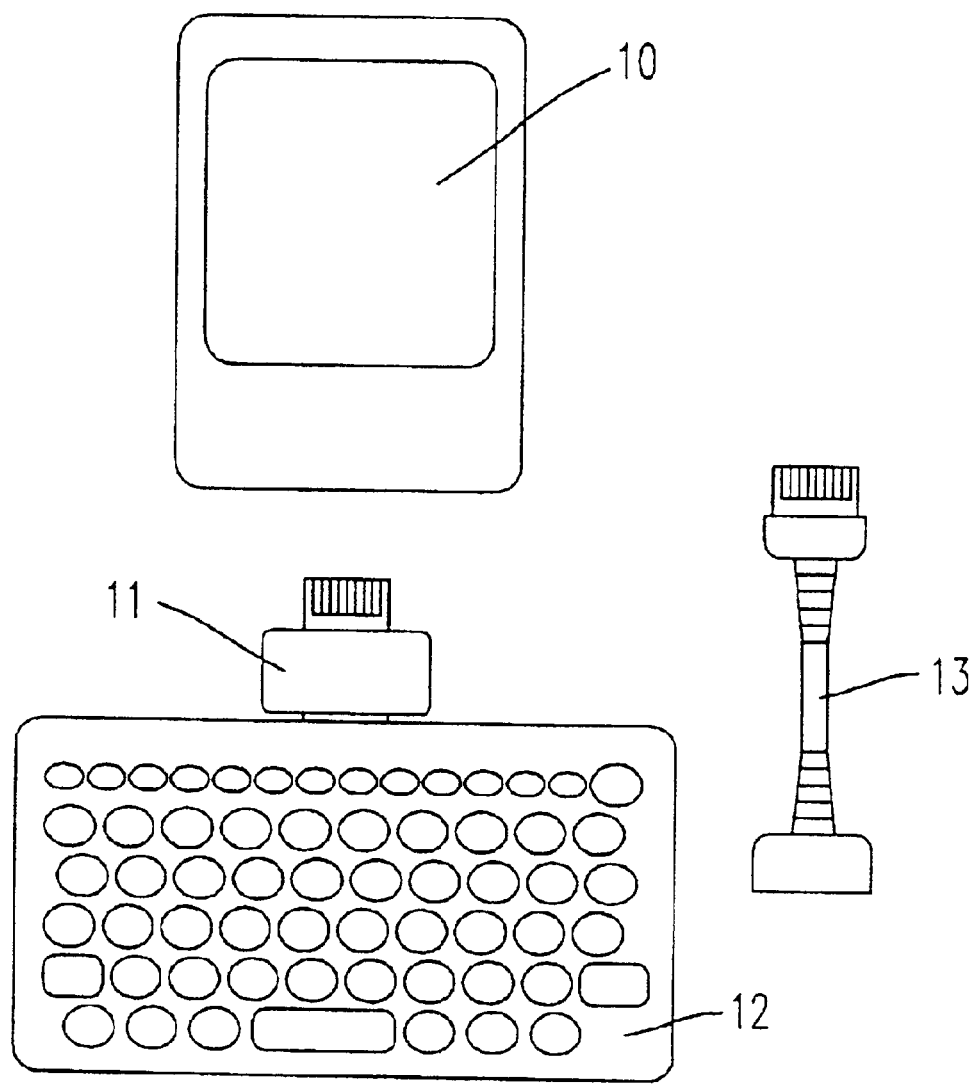
Figure 3A:
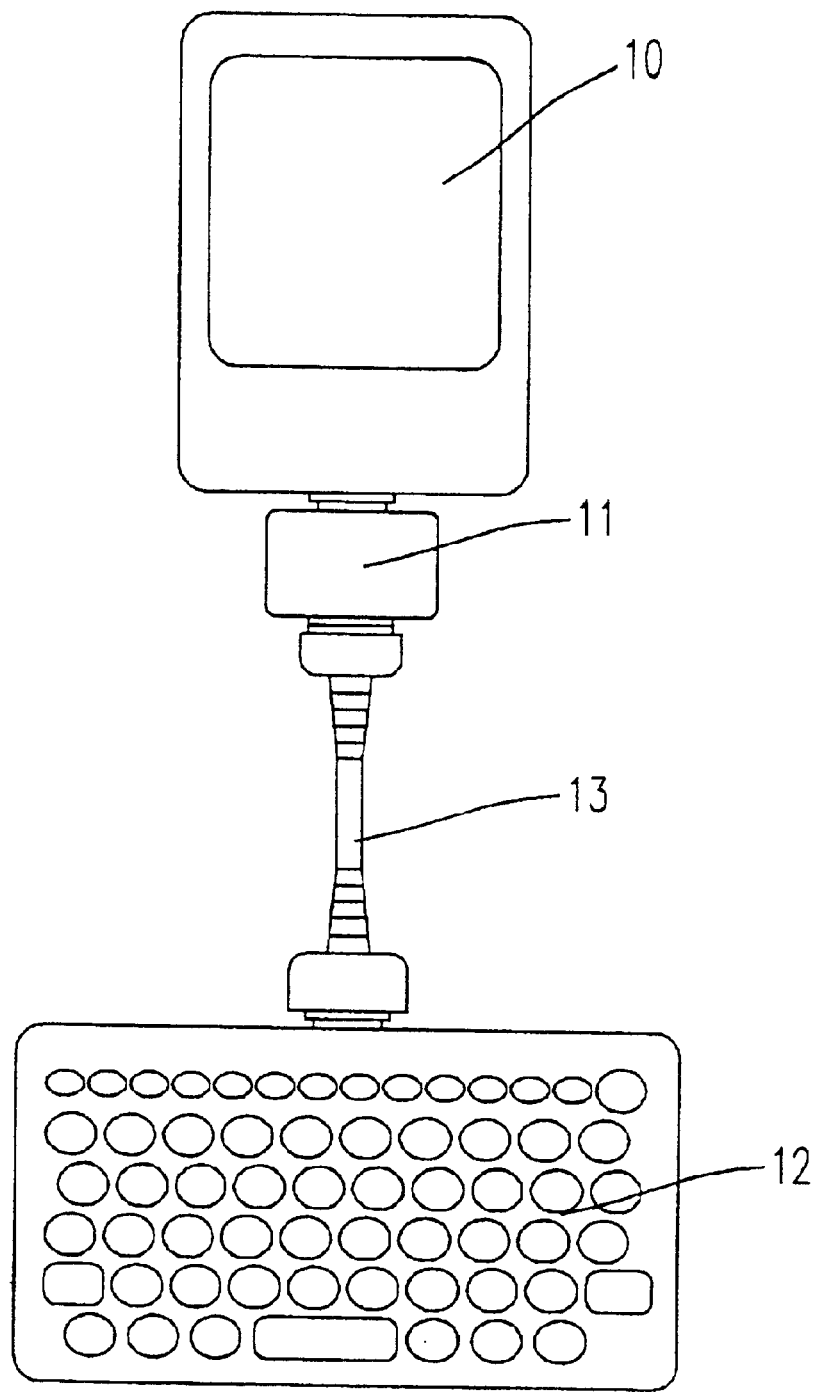
FIGS. 3(a) and 3(b) shows the connecting cable is detachably connected between the input device and the speech receiving and recognizing device according to the third embodiment of the present invention.
Figure 3B:
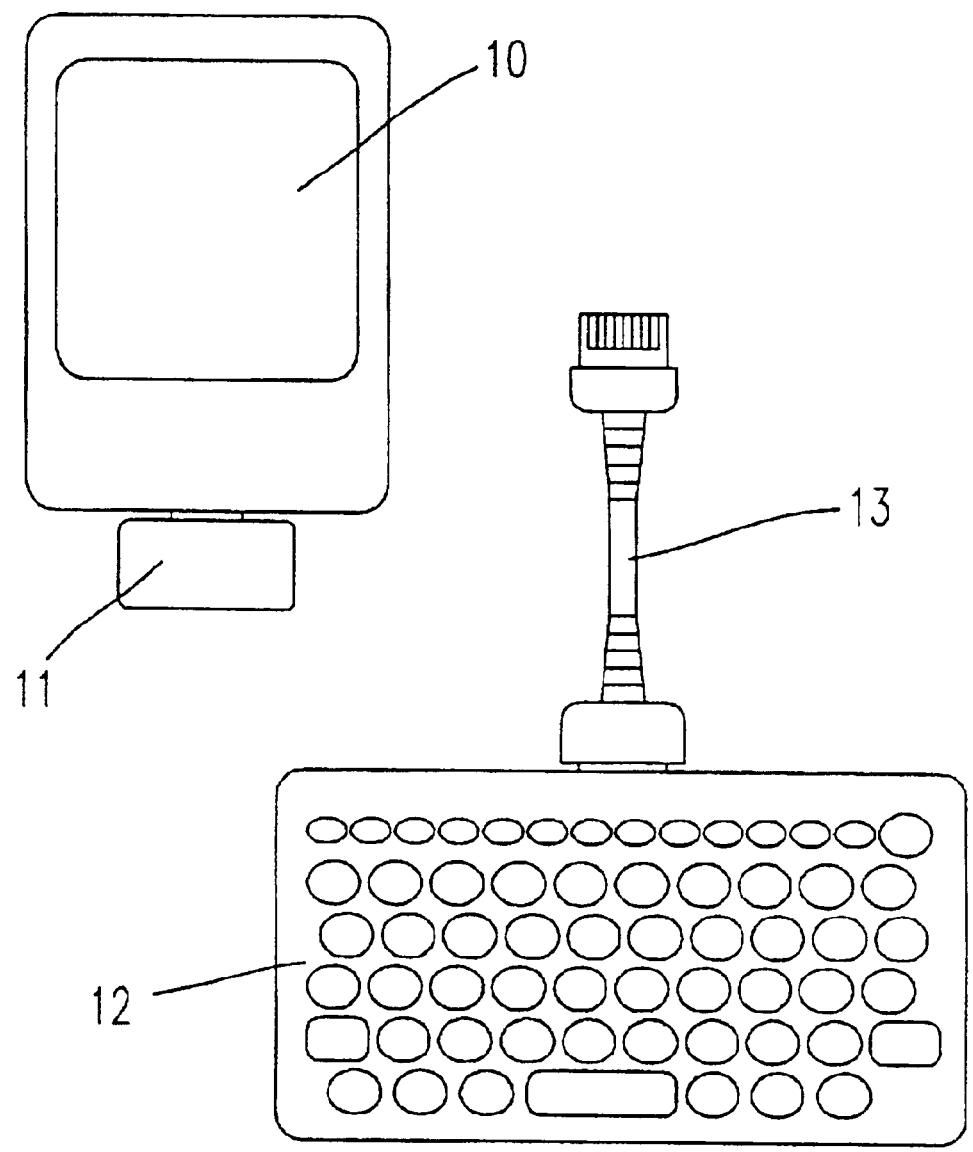

FIG. 1 shows a portable electronic device 10, e.g. a PDA (personal assistance) is directly connected to an external data-input device. The external data-input device includes a receiving and recognizing device 11 and an input device, e.g. a keyboard, for inputting the data into the portable electronic device. FIG. 2 shows the external data-input device can be detachably connected to the PDA 10. The external data-input device includes a speech receiving and recognizing device 11 detachably connected with the potable electronic device for sending a controlling signal to the PDA 10 when the speech receiving and recognizing device 11 receives a speech signal from an user, and an input device 12, e.g. a keyboard, also detachably connected with the PDA 10 and the speech receiving and recognizing device 11 for storing the controlling signal when the input device is connected to the speech receiving and recognizing device 11. For convenience, a connecting cable 13 can be made of a flexible material for bending so as to make the external data-input device could be bent at different angle and position. FIG. 2(a) shows the connecting cable 13 is directly connected between the electronic device 10 and the speech receiving and recognizing device 11. Certainly, the connecting cable 13 can be detachably connected with the speech receiving and recognizing device 11 and the input device 12, as can be seen in FIG. 3(a) and FIG. 3(b).

Figure 4:
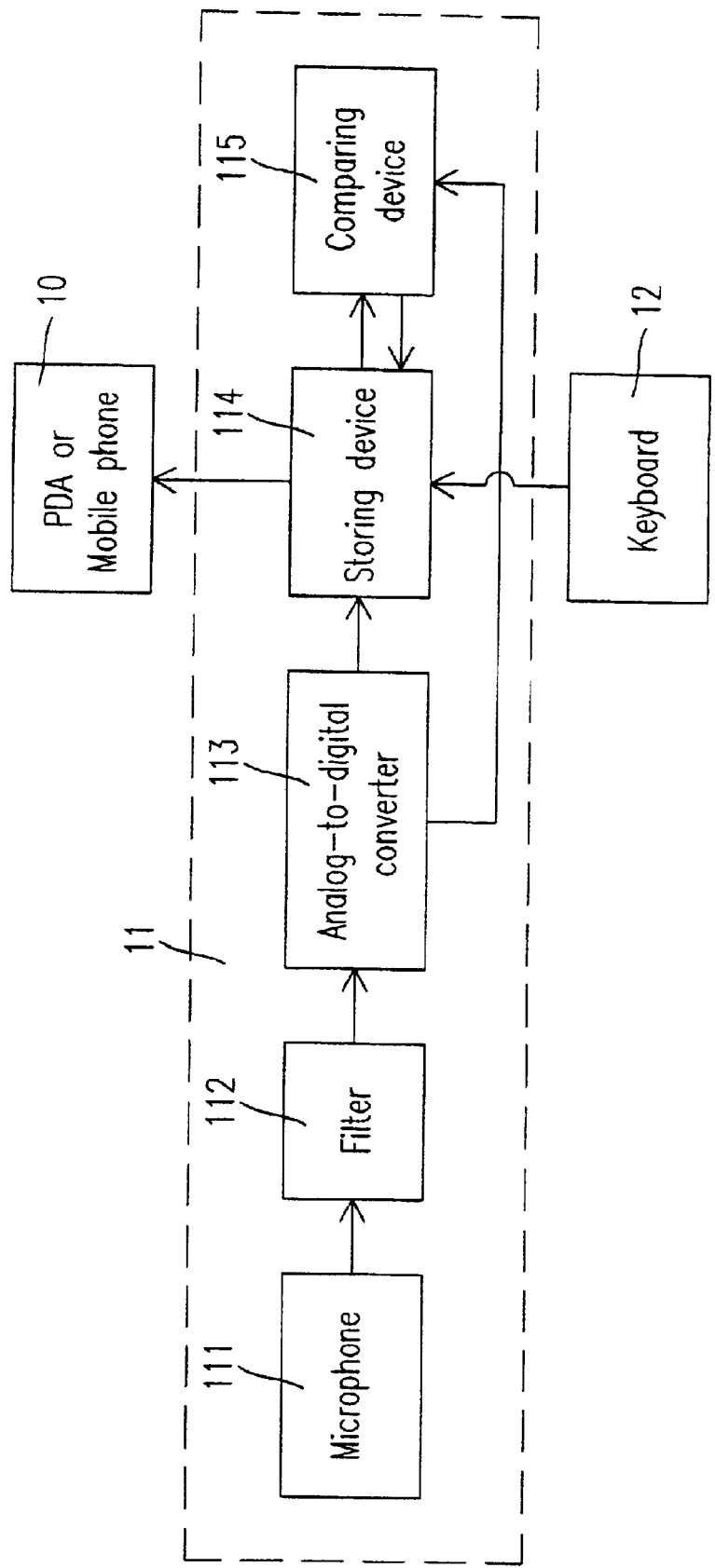
FIG. 4 is a circuit block diagram of the speech receiving and recognizing device according to the present invention.

FIG. 4 shows the speech receiving and recognizing device 11 further includes a microphone 111, a filter 112, an analog-to-digital converter 113, a storing device 114 and a comparing device 115. A speech spoken from a user can be stored into the speech receiving and recognizing device 11 and learned by the electronic device 10 so as to build a learning mode in the speech receiving and recognizing device 11. First, the microphone 111 is used for receiving a first speech signal and converting the first speech signal into an analog signal. The filter 112 electrically connected to the microphone 111 is used for filtering background noises and other noises different from human sound frequency. Next, an analog-to-digital converter 113 electrically connected with the filter 112 is used for converting the analog signal passing through the filter 112 into a first digital signal. A storing device 114 electrically connected with said analog-to-digital converter 113 is used sequentially for storing the first digital signal and the controlling signal and building a corresponding relation between the first digital signal and the controlling signal. In addition, the comparing device 115 electrically connected to the analog-to-digital converter 113 and the storing device 114 is used for comparing the first digital signal stored in the storing device 114 with a second digital signal which is converted from a second speech signal via the microphone 111, the filter 112 and the analog-to-digital converter 113, and sending the controlling signal to the PDA 10 according to the corresponding relation between the first digital signal and the controlling signal when the degree of the similarity between the first digital signal and the second digital signal is larger than a threshold value.

Figure 5A:
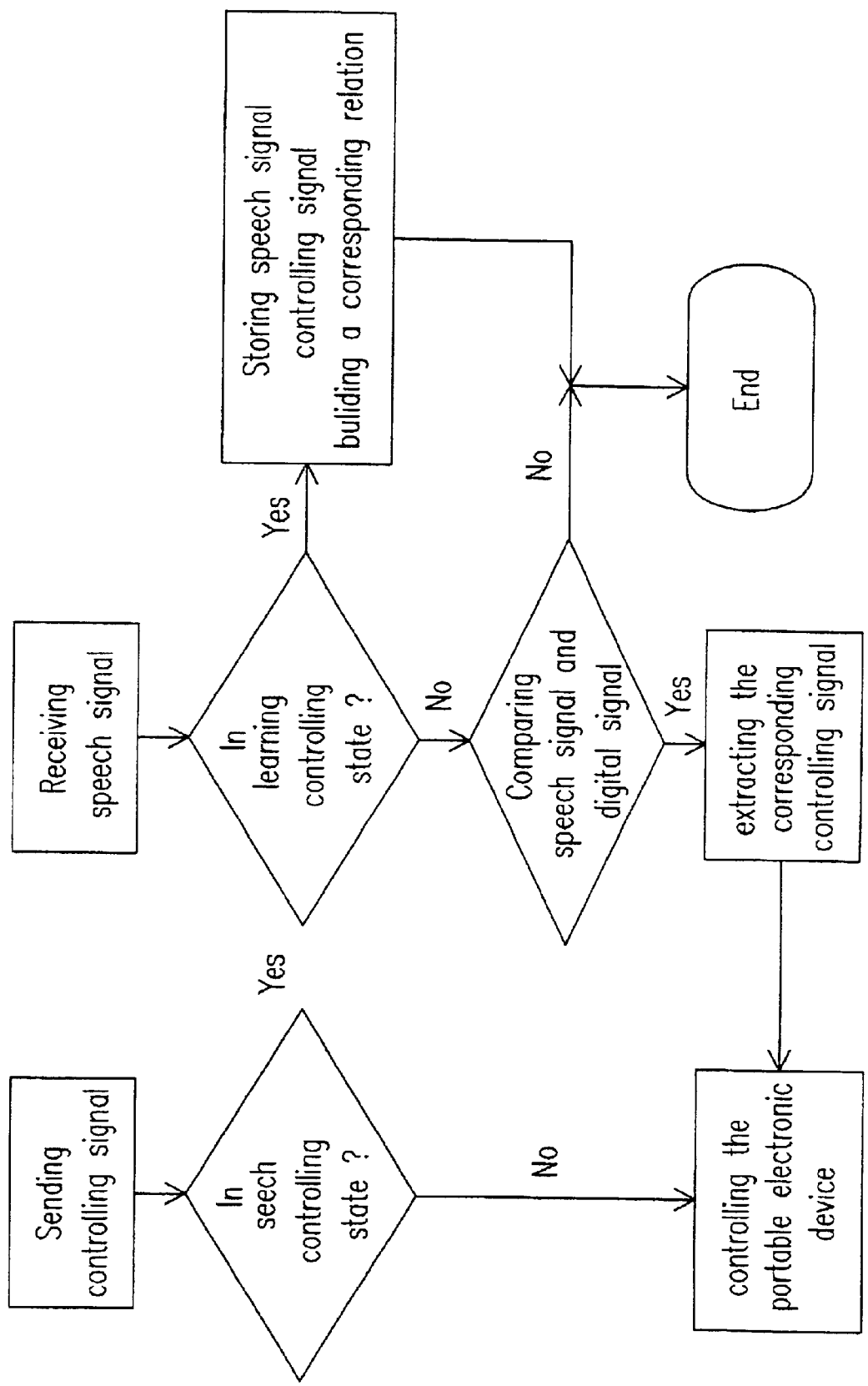
FIG. 5(a) shown the flowchart of the speech inputting and controlling method is operated according to the present invention, wherein the input device is connected to the portable electronic.

Moreover, a speech inputting and controlling method is provided in the present invention to achieve the processing processes operated by the speech receiving and recognizing device 11. FIG. 5(a) shown the flowchart of the speech inputting and controlling method is operated according to the present invention, wherein the input device is connected to the speech receiving and recognizing device 12. Users can use the keyboard 12 to input data or use the receiving and recognizing device 11 to build a speech into the PDA 10. The controlling process is described as the following steps in detail.

When a speech or a data is inputted, it will cause the speech receiving and recognizing device 11 to enter into a learning mode in a speech controlling state. For example, if a user pronounces "fon buk", a first speech signal representative of "fon buk" would be received by the speech receiving and recognizing device 11. Then, the first speech signal will be converted via the microphone 111, the filter 112 and the analog-to-digital converter 113 into a first digital signal, and stored in the storing device 114. At the same time, a word "phone book" or a hot key as representing "fon buk"

is inputted and stored at the storing device. Next, a controlling signal corresponding to "fon buk" is sent by the input device 13 to be stored in the storing device so as to build a corresponding relation between the first speech signal and the controlling signal in the learning mode. As a result, lots of words, keypads or hot keys as representative of many speech signals could be set when the words, keypads or hot keys is inputted or pressed according to the method of the present invention.

As the speech receiving and recognizing device 11 is controlled to enter into a speech controlled state in a waiting mode, the speech receiving and recognizing device 11 is waiting a second speech signal. When a second digital signal converted from a second speech signal, e.g. "fon buk", via the microphone 111, the filter 112 and the analog-to-digital converter 113 is transmitted and stored at the storing device 114, the comparing device will compare the first digital signal stored in the storing device 114 with the second digital signal. If the degree of the similarity between the first digital signal and the second digital signal is larger than a threshold value, the controlling signal will be sent into the portable electronic device according to the corresponding relation between the first digital signal and the controlling signal. For example, comparing the second digital signal representative of "fon buk" with the first digital signal, if the degree of the similarity between the first digital signal and the second digital signal is larger than a threshold, the controlling signal corresponding the "phone book" will be sent into the portable electronic device to execute the "phone book" program.

Figure 5B:
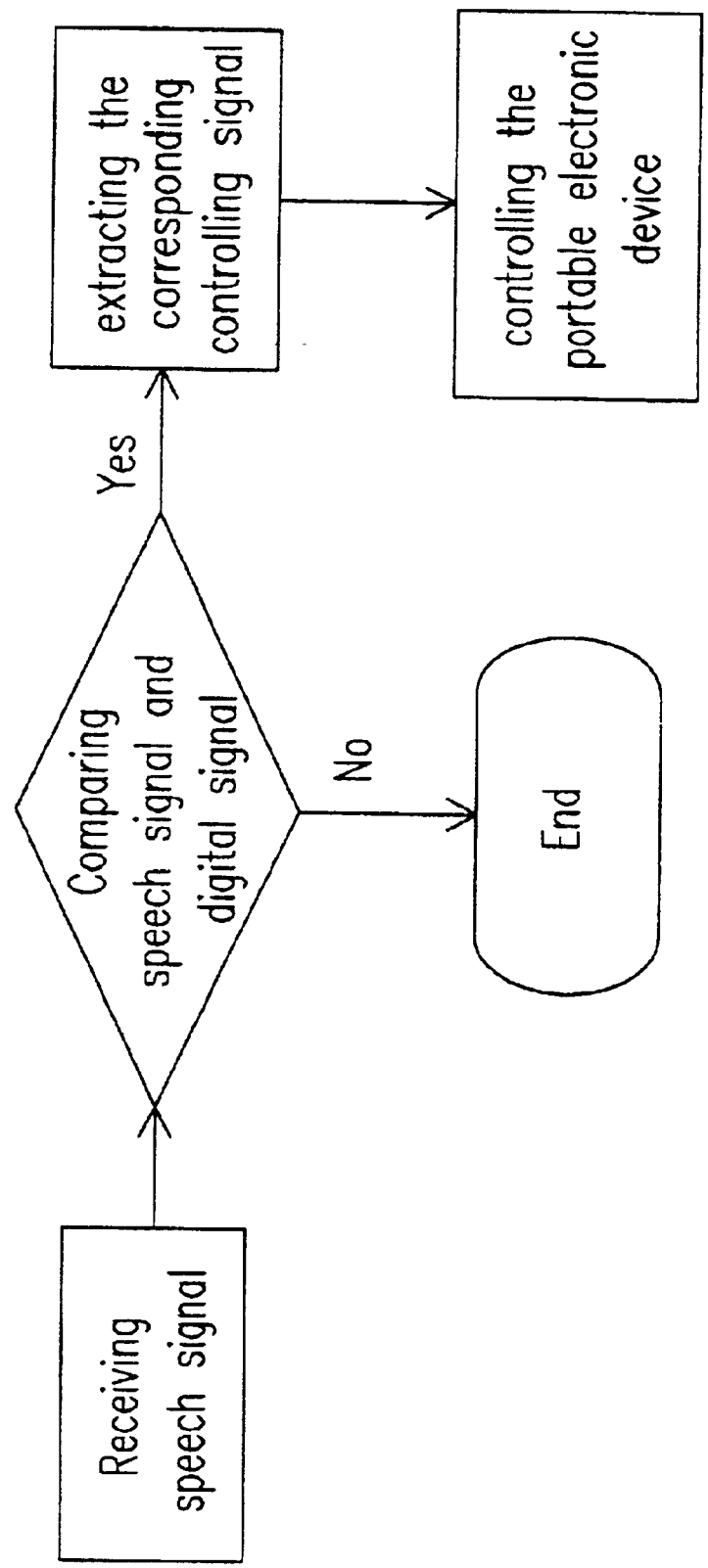
FIG. 5(b) shown the flowchart of the speech inputting and controlling method is operated according to the present invention, wherein the input device is the speech receiving and recognizing device.

Furthermore, the speech receiving and recognizing device 11 can be operated with the portable electronic device along for building the learning mode as the descriptions described above. FIG. 5(b) shown the flowchart of the speech inputting and controlling method is operated according to the present invention, wherein the input device is the speech receiving and recognizing device.

Figure 6A:
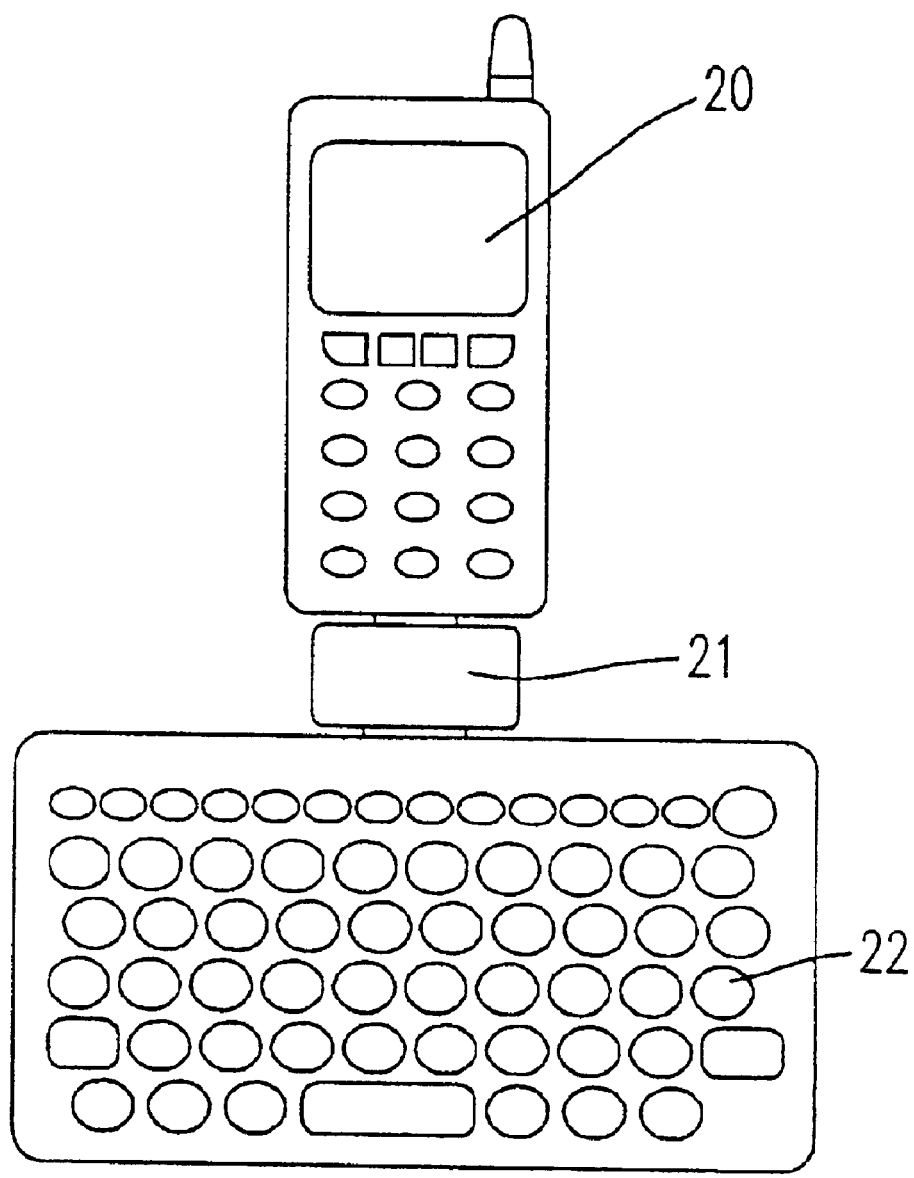
FIGS. 6(a) and 6(b) show the external data-input device is detachably connected to a mobile phone for inputting speech and data according to the preferred implement of the present invention.
Figure 6B:
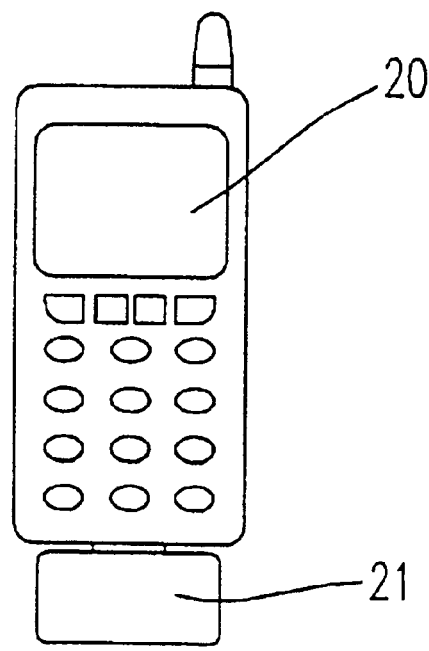
Figure 6B:
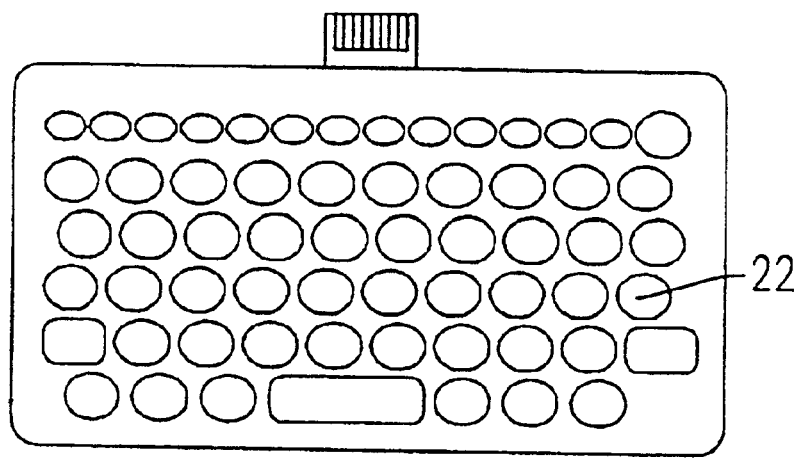
Figure 7A:
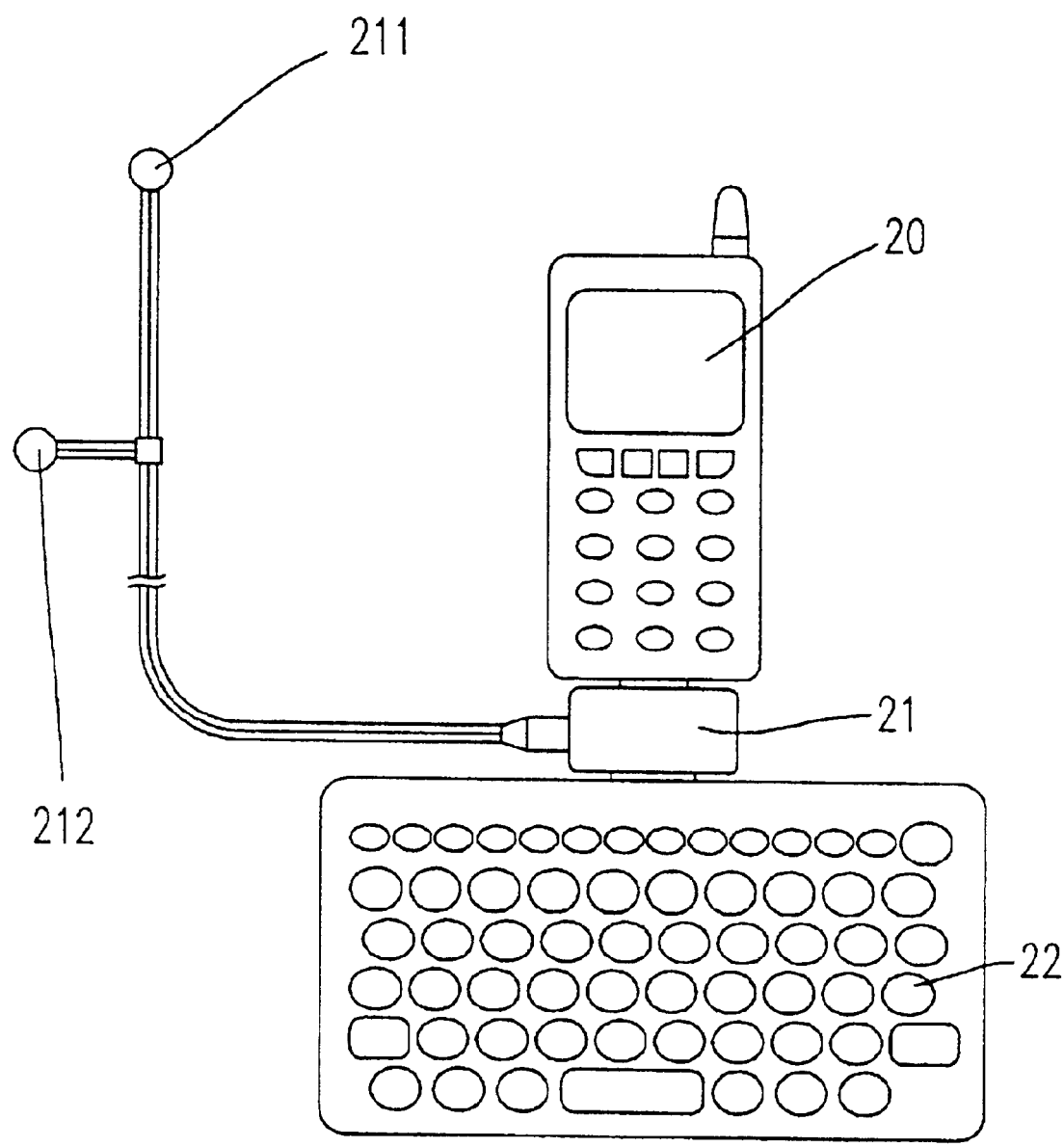
FIGS. 7(a) and 7(b) show the accessories of the receiving and recognizing device including a handsfree earphone and a microphone is connected with the mobile phone and the keyboard.
Figure 7B:
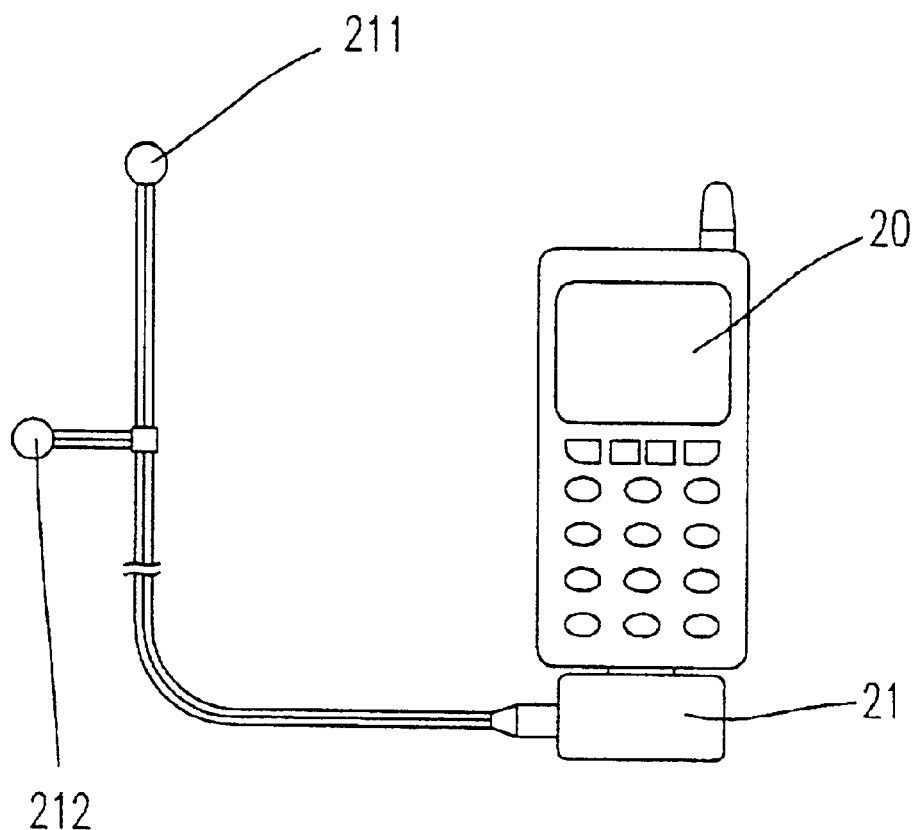
Figure 7B:
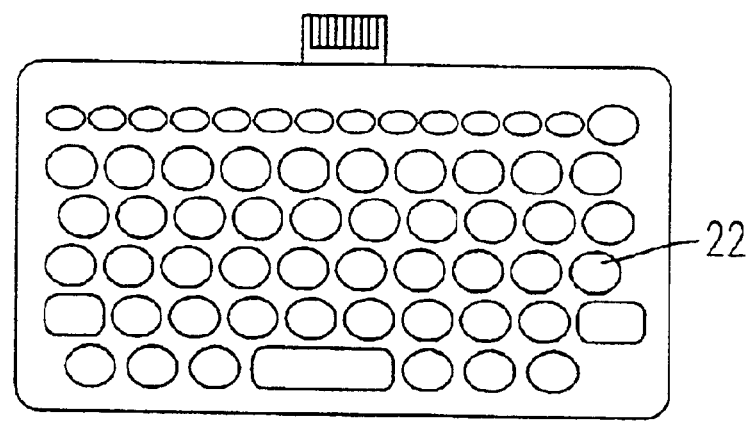
Figure 8A:
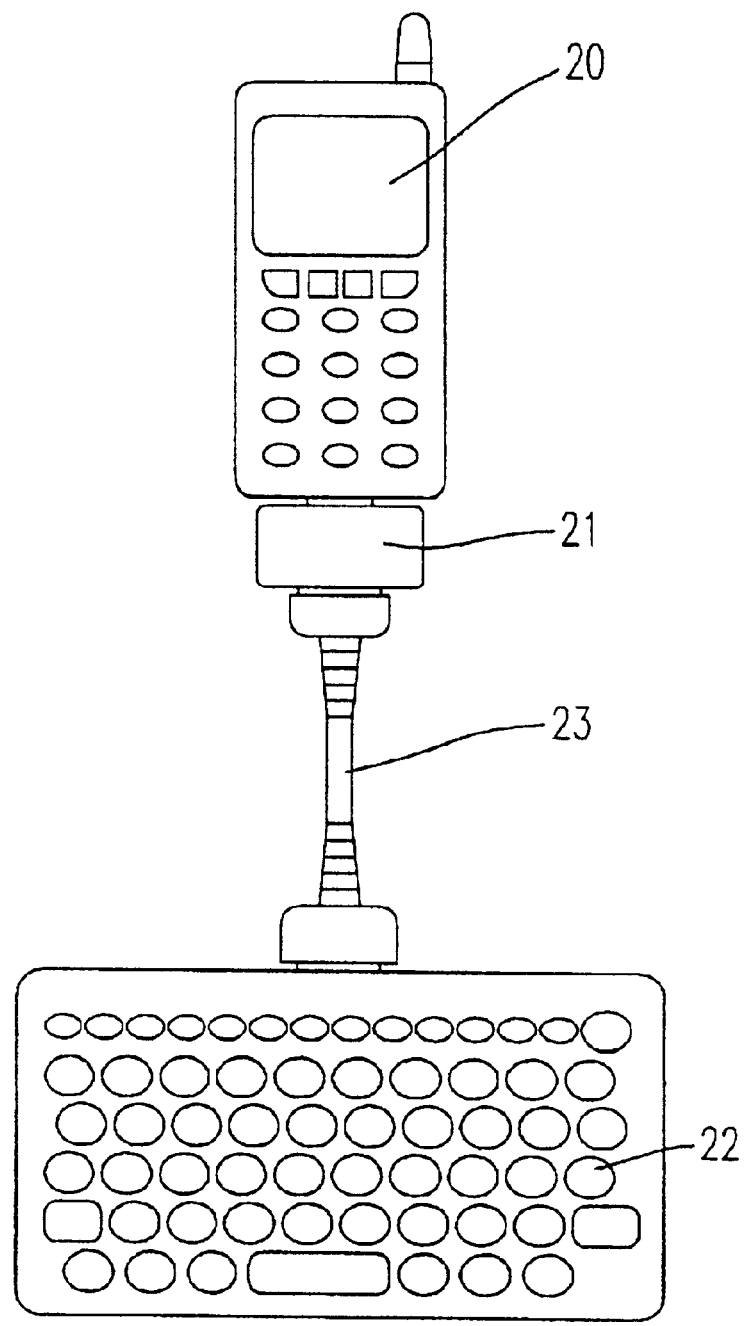
FIGS. 8(a) and 8(b) show a connecting cable is detachably connected with the speech receiving and recognizing device and the keyboard.
Figure 8B:
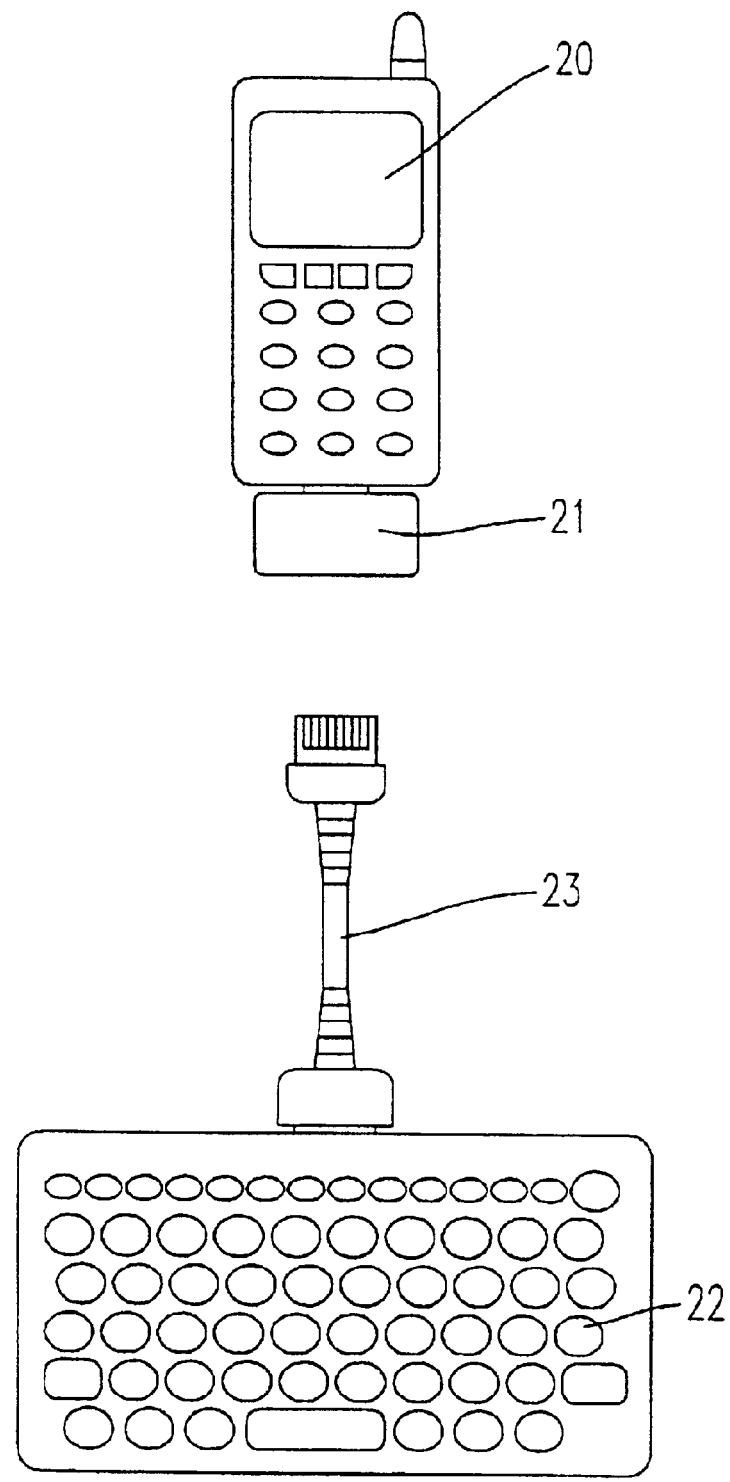
Figure 9A:
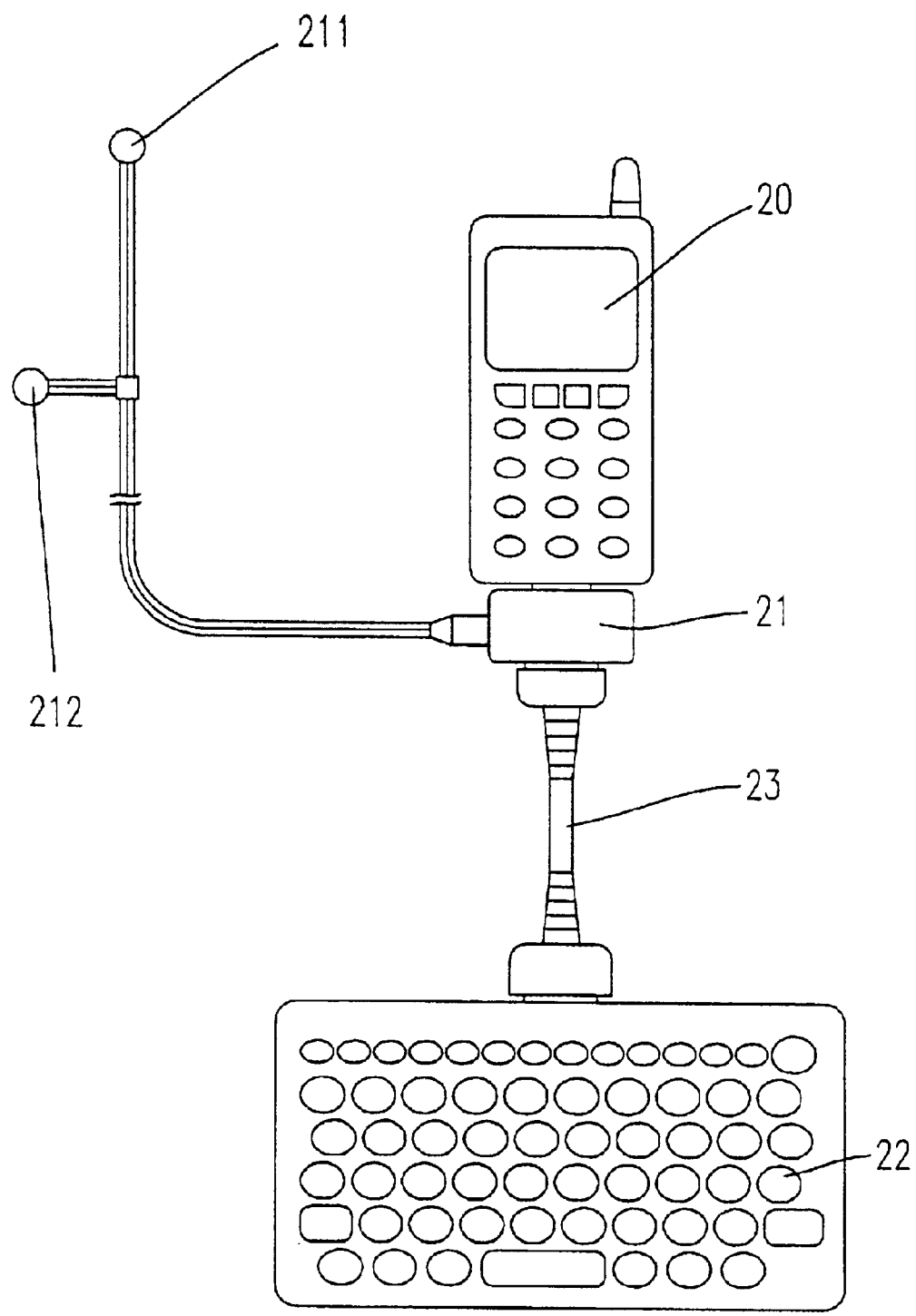
FIGS. 9(a) and 9(b) show a connecting cable is detachably connected between the receiving and recognizing device and the keyboard, wherein the speech receiving and recognizing device is further connected to the accessories.
Figure 9B:
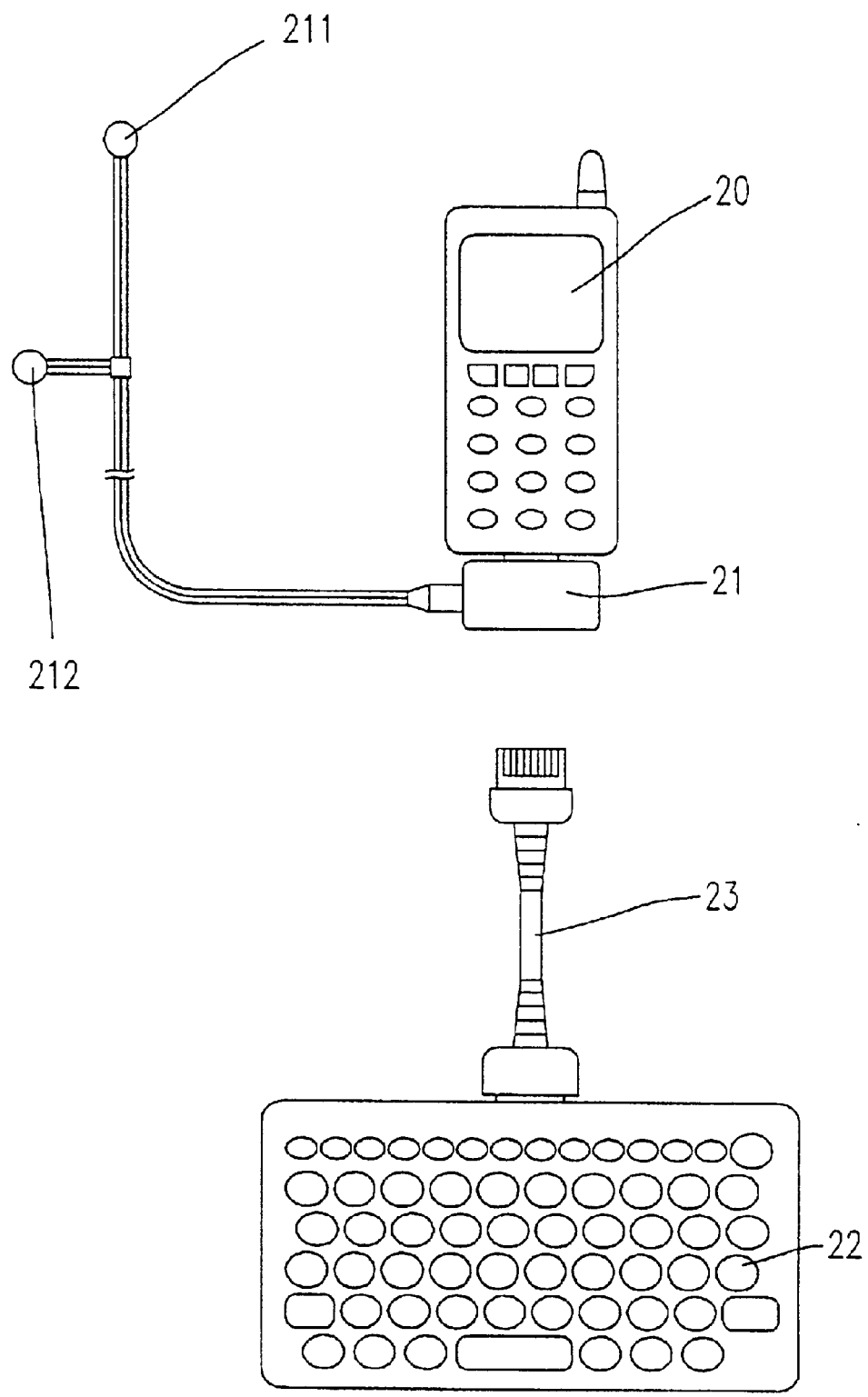

FIGS. 6(a) and 6(b) further show the external data-input device is applied to a mobile phone for inputting speech or data according to the preferred embodiment of the present invention. The external data-input device including a receiving and recognizing device 21 and a keyboard 22 is detachable connected to the mobile phone 20. The keyboard 22 is also detachably connected with the receiving and recognizing device 21 and the mobile phone 20. FIGS. 7(a) and 7(b) show the accessories of the receiving and recognizing device 21, for example a handsfree earphone 211 and a microphone 212 is connected with the mobile phone 20 and the keyboard 22. FIGS. 8(a) and 8(b) show a connecting cable is detachably connected with the speech receiving and recognizing device and the keyboard. FIGS. 9(a) and 9(b) show a connecting cable is detachably connected between the receiving and recognizing device and the keyboard, wherein the speech receiving and recognizing device is further connected to the accessories. As can be seen, the working principles and the processing progresses operated by the receiving and recognizing device 21 are as those of the descriptions described above.

Accordingly, the external data-input device and speech inputting and controlling method of the present invention thoroughly overcomes the drawbacks in the prior art and bear advantage of being widely applied to different electronic devices, e.g. the PDA and the mobile phone. The user can use the keyboard in normal size to input the data into the portable electronic device and operate a speech-learning mode by the receiving and recognizing device, and also can also achieve the purpose of controlling and operating the speech controlling function in the learning mode which is preset in the receiving and recognizing device by using the receiving and recognizing device and the portable electronic device after the input device, e.g. a keyboard, is disconnected from the receiving and recognizing device.

While the invention has been described in terms of what are presently considered to be the most practical and preferred embodiments, it is to be understood that the invention needs not be limited to the disclose embodiments. On the contrary, it is tented to cover various modification and similar arrangements included within the spirit and scope of the appended claims which are be accorded with the broadest interpretation so as to encompass all such modifications and similar structure.

I claim:

1. An external data-input device for a portable electronic device comprising:

a speech receiving and recognizing device detachably connected with said portable electronic device for sending a controlling signal to said portable electronic device when said speech receiving and recognizing device receives a first sound speech signaling;

for receiving the sound speech signal and converting it into an analog signal;

electrically connected to the microphone, for filtering from the analog signal noises different from human sound frequencies;

electrically connected to the filter, for converting the filtered analog signal into a first digital signal;

electrically connected to the analog-to-digital converter, for storing the first digital signal and the controlling signal and building a corresponding relation between said first digital signal and said controlling signal;

electrically connected to said analog-to-digital converter and said storing device, for comparing said first digital signal stored in said storing device with a second digital signal which is converted from a second sound speech signal via said microphone, said filter and analog-to-digital converter, and sending said controlling signal to said portable electronic device according to said corresponding relation between said first digital signal and said controlling signal when the degree of the similarity between said first digital signal and said second digital signal is larger then a threshold value; and an input device detachably connected to said speech receiving and recognizing device and said portable electronic device for storing said controlling signal in said speech receiving and recognizing device when said input device is connected to said speech receiving and recognizing device.

2. The external data-input device according to claim 1, wherein said comparing device is a digital signal processor (DSP).

3. The external data-input device according to claim 1, wherein said input device is a keyboard having a hot key for sending said controlling signal when said hot key is pressed.

4. The external data-input device according to claim 1, wherein said external data-input device further comprises a connecting cable detachably connected between said speech receiving and recognizing receiving device and said input device.

5. The external data-input device according to claim 1, wherein said external data-input device further comprises a connecting cable detachably connected between said speech receiving and recognizing receiving device and said electronic device.

6. The external data-input device according to claim 1, wherein said electronic device is a personal digital assistant (PDA).

7. The external connecting external data-input device according to claim 1, wherein said electronic device is a mobile phone.

8. A speech inputting and controlling method for a portable electronic device and an external data-input device, wherein said external data-input device has a speech receiving and recognizing device detachably connected to said portable electronic device and an input device detachably connected to said speech receiving and recognizing device and said portable electronic device, said method comprising the steps of:

(a) causing said speech receiving and recognizing device to enter into a learning mode in a speech controlling state;

(b) receiving a first speech signal from a user and a controlling signal from said input device in said learning mode, and building a corresponding relation between said first speech signal and said controlling signal;

(c) causing said speech receiving and recognizing device to enter into a waiting mode; and (d) comparing a first digital signal converted from the first speech signal with a second digital signal which is converted from a second speech signal, and sending said controlling signal to said portable electronic device according to said corresponding relation between said first digital signal and said controlling signal when the degree of similarity between said first digital signal and said second digital signal is larger than a threshold value.

9. The method according to claim 8, wherein said second speech signal is received by said speech receiving and recognizing device.

10. The method according to claim 8, wherein said portable electronic device is a personal digital assistant (PDA).

11. The method according to claim 8, wherein said electronic device is a mobile phone.

12. An external data-input device for a portable electronic device comprising:

a speech receiving and recognizing device detachably connected with said portable electronic device for converting a speech signal into a digital signal and sending a controlling signal to said portable electronic deviceing;

for receiving the speech signal and converting it into an analog signal;

electrically connected to the microphone, for filtering from the analog signal noises different from human sound frequencies;

electrically connected to the filter, for converting the filtered analog signal into a first digital signal;

electrically connected to the analog-to-digital converter, for storing the first digital signal and the controlling signal and building a corresponding relation between said first digital signal and said controlling signal;

electrically connected to said analog-to-digital converter and said storing device, for comparing said first digital signal stored in said storing device with a second digital signal which is converted from a second sound speech signal via said microphone, said filter and analog-to-digital converter, and sending said controlling signal to said portable electronic device according to said corresponding relation between said first digital signal and said controlling signal when the degree of the similarity between said first digital signal and said second digital signal is larger then a threshold value; and an input device detachably connected to said speech receiving and recognizing device and said portable electronic device for storing said controlling signal in said speech receiving and recognizing device when said input device is connected to said speech receiving and recognizing receiving device.

13. The external data-input device according to claim 12, wherein said comparing device is a digital signal processor (DSP).

14. The external data-input device according to claim 12, wherein said input device is a keyboard having a hot key for sending said controlling signal when said hot key is pressed.

15. The external data-input device according to claim 12, wherein said external data-input device further comprises a connecting cable detachably connected between said speech receiving and recognizing receiving device and said input device.

16. The external data-input device according to claim 12, wherein said external data-input device further comprises a connecting cable detachably connected between said speech receiving and recognizing receiving device and said electronic device.

17. The external data-input device according to claim 12, wherein said electronic device is a personal digital assistant (PDA).

18. The external data-input device according to claim 12, wherein said portable electronic device is a mobile phone.

* * * * *